April 28, 1931.  W. D. EVERETT ET AL  1,802,968
PLASTIC STOCK CUTTING MACHINE
Filed Aug. 2, 1927   3 Sheets-Sheet 3
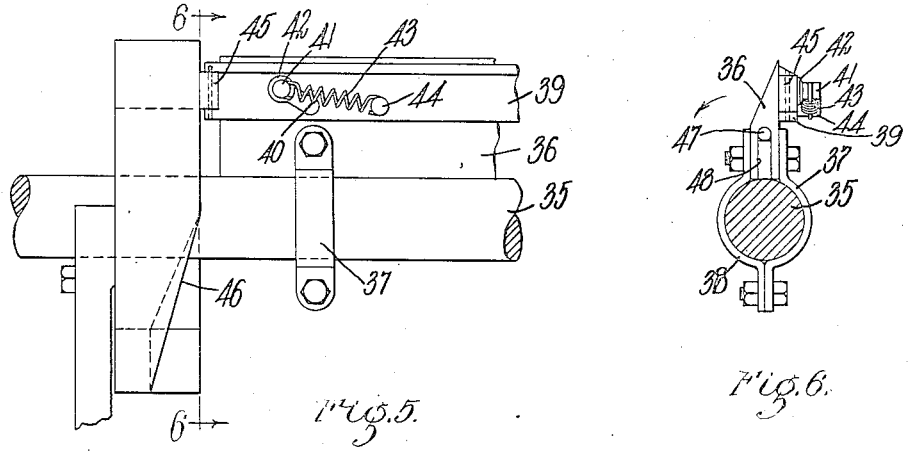
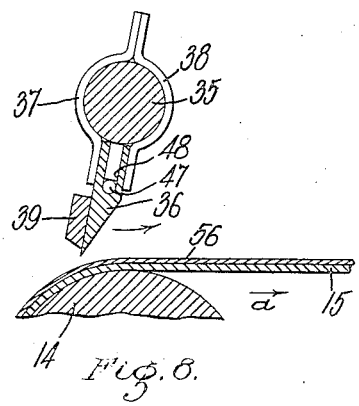
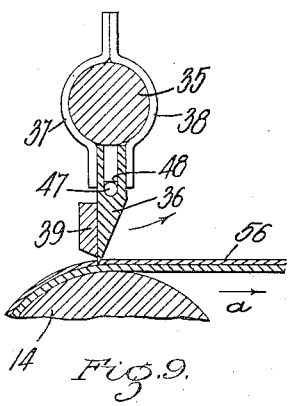
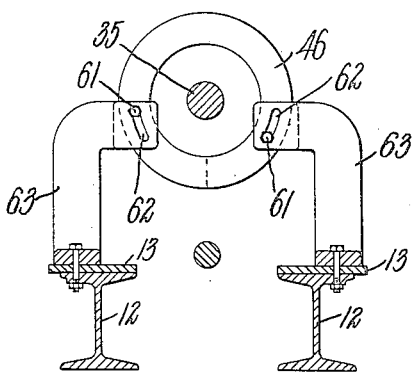
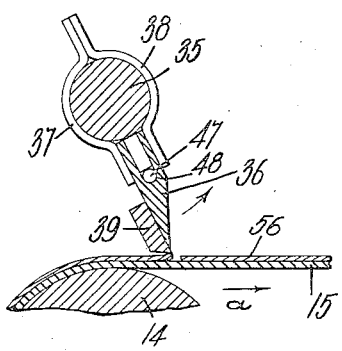
Inventors.
William Dexter Everett,
Archibald Williams Jr.
by Charles L. Gooding, Atty.

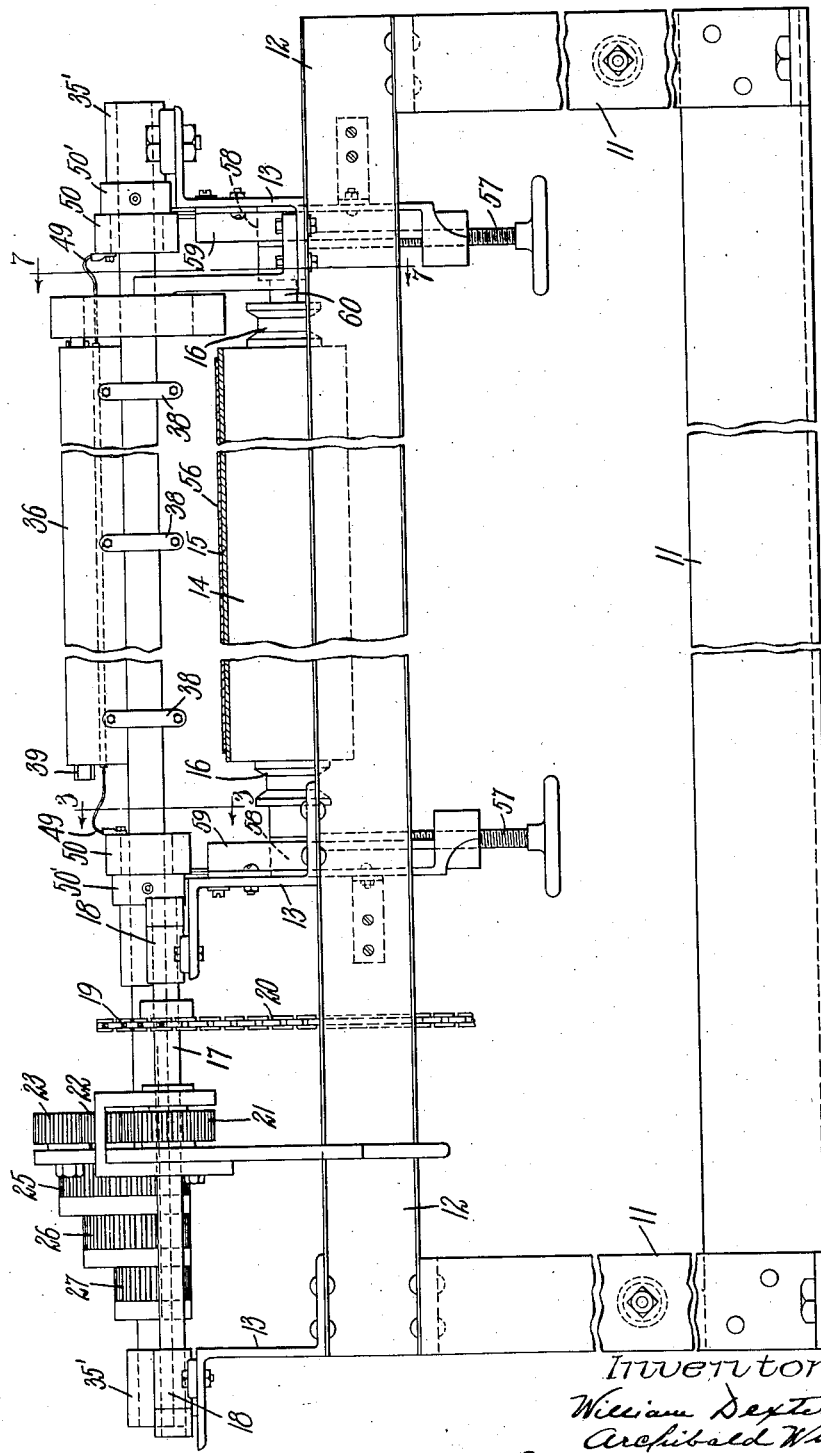

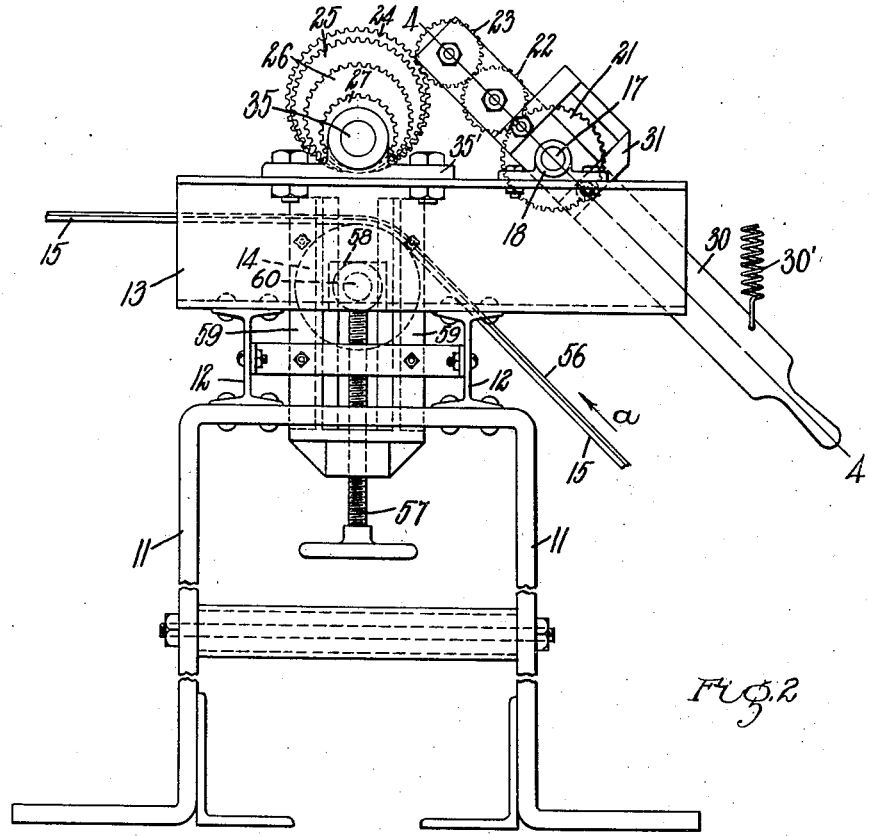
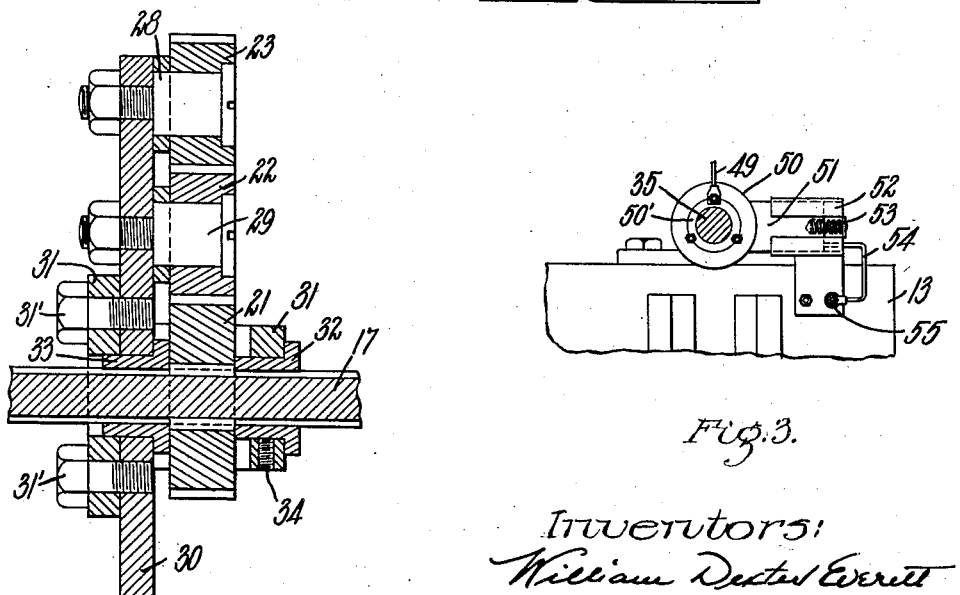

Patented Apr. 28, 1931

1,802,968

UNITED STATES PATENT OFFICE

WILLIAM DEXTER EVERETT AND ARCHIBALD WILLIAMS, JR., OF WATERTOWN, MASSACHUSETTS, ASSIGNORS, BY MESNE ASSIGNMENTS, TO HOOD RUBBER COMPANY, INC., OF WILMINGTON, DELAWARE, A CORPORATION OF DELAWARE

PLASTIC-STOCK-CUTTING MACHINE

Application filed August 2, 1927. Serial No. 210,075.

This invention relates to a machine for severing sheet material, such as, rubber sheeting.

The object of the invention is to provide a machine which will automatically sever a rubber sheeting material across its entire width and in any desired lengths. The rubber sheeting is conveyed to the machine by an endless belt conveyer from heated calender rolls. The sheeted rubber is fed on to the conveyer belt at a temperature of approximately 175° Fahrenheit. When the sheeted rubber arrives at the machine to be severed it is then at a temperature of approximately 100° Fahrenheit.

Another object of the invention is to provide means whereby the cutter blade for severing the sheet material is electrically heated. The machine embodies also, mechanism for imparting a variable rotation to the cutter blade so that at the time that it is severing the sheet material, it is moving at its greatest speed. Furthermore, the machine embodies mechanism whereby different lengths between successive cuts may be obtained.

To these ends the invention consists in the combination and arrangement of parts set forth in the following specification and particularly pointed out in the claims thereof.

Referring to the drawings:—

Figure 1 is an end elevation of the machine of this invention, the belt conveyer and the sheet material thereon being shown in section.

Fig. 2 is a side elevation of the machine as viewed from the left of Fig. 1.

Fig. 3 is a sectional elevation taken on the line 3—3 of Fig. 1, illustrating one of the brushes and its respective collector, whereby electricity is carried to the cutter blade in order to heat the same.

Fig. 4 is a sectional elevation taken on line 4—4, Fig. 2, and broken away to save space.

Fig. 5 is a detail end elevation of a portion of the cutter blade and scraper with the cam which actuates the scraper, as viewed from the left of Fig. 2.

Fig. 6 is a sectional elevation taken on line 6—6, Fig. 5, and viewed in the direction of the arrows thereon.

Fig. 7 is a sectional elevation taken on line 7—7, Fig. 1, viewed in the direction of the arrows thereon.

Fig. 8 is a detail sectional elevation illustrating the cutter blade and scraper as the cutter blade is about to engage the sheet material.

Fig. 9 is a sectional elevation similar to Fig. 8, illustrating the cutter blade severing the material.

Fig. 10 is a sectional elevation similar to Figs. 8 and 9, illustrating the cutter blade after it has severed the sheet material, and the scraper blade in position to scrape off any of the sheet material which may have adhered to the cutter blade.

Like numerals refer to like parts throughout the several views of the drawings.

In the drawings, 11 is a framework to which are fastened I-beams 12, which also form a portion of the frame-work, and to said I-beams are fastened angle beams 13 also constituting a portion of the frame. 14 is a rotary drum for the belt conveyer 15. The rotary drum 14 is rotatably mounted upon the frame of the machine and is driven by pulleys 16 which are rotated by means of belts. A driving shaft 17 is rotatably mounted in bearings 18 fast to the angle beams 13 and rotary motion is imparted to the driving shaft 17 by a sprocket gear 19 and chain 20 driven from a suitable source of power, not shown in the drawing.

A gear 21 is splined to the driving shaft 17 and meshes into an intermediate gear 22, which in turn meshes into another intermediate gear 23 which meshes into an eccentrically mounted gear 24, as shown in Fig. 2, and which may be caused, as hereinafter described, to mesh into any one of other eccentrically mounted gears 25, 26 and 27. The gears 22 and 23 are mounted to rotate upon studs 28 and 29, which are fastened to a gear shift lever 30 which has fastened thereto by means of the screws 31' a U-shaped piece 31 forming in effect a portion of the gear shift lever 30 and imparting thereto a bifurcated construction.

The portion 31 of the gear shift lever 30 engages on opposite sides of the gear 21, bushings 32 and 33 positioned upon opposite sides of the gear 21, and the portion 31 of the lever 30 is fastened by a set screw 34 to the bushing 32, so that the gear shift lever 30 can be rocked about the shaft 17 and can also be moved longitudinally thereof manually and when so moved longitudinally of the shaft 17, the gears 21, 22 and 23 will be moved with it and thus the gear 23 can be moved out of engagement with the gear 24 by pushing downwardly upon the handle of the gear shift lever 30 and then moving the lever, together with the gears 21, 22 and 23, toward the left, Fig. 1, until the gear 23 is brought into alignment with any one of the gears 25, 26 or 27, as may be desired, with which it is normally held in engagement by a spring 30′.

The gears 24, 25, 26 and 27 are fastened to a cutter blade shaft 35, which is rotatably mounted in bearings 35′ on the angle beams 13. Thus it will be seen that the shaft 35 may be rotated by the gearing hereinbefore described at a variable speed in each rotation, and also that it may be rotated a varying number of times per minute, depending upon which of the gears 24, 25, 26 and 27 the gear 23 is in mesh with. Moreover, as will be seen from an inspection of Figures 1 and 2, the eccentrically mounted gears are so mounted on shaft 35 that portions of the gear peripheries which are closest to the axis of the shaft are substantially in alignment in a direction axially of the shaft, and further that these portions of the gear peripheries are of substantially equal distance from the shaft axis, thus assuring approximately the same cutter speed at the time of severing the material regardless of which eccentrically mounted gear is in mesh with the driving gear.

A cutter blade 36 is fastened to the cutter shaft 35 by clamps 37 and 38, and mounted upon the cutter blade 36 is a scraper blade 39 provided with inclined slots 40 through each of which projects a stud 41 which is flanged at 42 to hold the scraper blade against the face of the cutter blade.

A spring 43, attached at one end to the stud 41 and at the other end to a pin 44 which is fastened to the scraper blade 39, tends to draw the scraper blade 39 toward the left Fig. 5, and rotatably mounted on the end of the scraper blade 39 is a cam roll 45 which engages a stationary cam 46, so that as the shaft 35, with the cutter blade 36, rotates in the direction of the arrow, Fig. 6, the scraper blade will be moved longitudinally thereof, according to the formation of the cam 46, and when moved longitudinally upon the cutter blade the inclined slots 40 coacting with the studs 41 will cause the scraper blade to be moved toward and away from the edge of the cutter blade as illustrated in Figs. 9 and 10, and this movement of the scraper blade on the cutter blade will cause any material which may have adhered to the cutter blade to be removed therefrom. The cam 46 may be adjusted circumferentially thereof by means of bolts 61 projecting through slots 62 in brackets 63 which are fastened to the frame of the machine.

The cutter blade is heated by means of an electric heating element 47 which extends through a slot 48 extending longitudinally of the cutter blade. The opposite ends of the heating element 47 are connected by wires 49 to collectors 50 which are fastened to insulating bushings 50′, which in turn are fastened to the cutter shaft 35, and the collectors 50 are engaged by brushes 51 which are slidably mounted in brackets 52 fast to the angle frames 13, the brushes 51 being held against their respective collectors by springs 53. The brushes 51 are connected by wires 54 to terminals 55, to which an electric circuit is connected.

The construction and arrangement of the collectors, the brushes and the terminals are illustrated in Fig. 3, this being the arrangement of said devices at the left hand end of Fig. 1, it being understood that the same is duplicated at the right hand end of Fig. 1.

The conveyer belt 15, see Figs. 1 and 2, passes over the drum 14 and carries the sheet material 56 to be severed, therewith, and being located directly beneath the shaft 35, it is evident that the cutter blade will engage the same in the manner illustrated in Figs. 9 and 10 as the cutter blade passes through the lower portion of its rotary path.

In order that the rubber may be severed and the conveyer belt left intact, it is necessary that the conveyer belt should be very accurately adjusted relatively to the cutter blade and this is accomplished by means of adjusting screws 57, see Figs. 1 and 2, which have screw-threaded engagement with the frame of the machine and bear against the under side of sliding blocks 58 which are arranged to move vertically in guides 59 on the frame of the machine and are moved vertically by the screws 57.

The drum 14 is fastened to a shaft 60 which is journalled to rotate in the sliding blocks 58, so that by adjusting the screws 57 carefully the shaft 60 and the drum thereon may be adjusted accurately at either end in order to position the drum, the conveyer belt and the material thereon accurately with relation to the cutter blade 36.

The general operation of the mechanism hereinbefore described is as follows:—The sheet material 56 from the calenders is carried by the belt conveyer 15 upwardly in the direction of the arrow $a$, Figs. 2, 8, 9 and 10, and as it passes over the drum 14, by which it is supported directly beneath the cutter shaft 35, the cutter blade is brought into engagement with the material 56 on the belt 15 in the manner and moving in the direction illustrated in Figs. 8, 9 and 10. The heated knife has any material which may adhere thereto removed therefrom by the scraper blade, as hereinbefore described.

The number of rotations per minute of the cutter shaft 35 depends upon which of the gears 24, 25, 26 or 27 the gear 23 is in engagement with. The feed of the material at the belt 15 is a constant, therefore, if the number of rotations of the shaft 35 varies, the length of the pieces cut by the cutter blade will vary.

We claim:

1. A machine for severing sheet material having, in combination, a movable support for sheet material, a cutter blade positioned transversely of said support and coacting therewith to sever said sheet material, mechanism to impart a rotary motion to said cutter blade, means to heat said cutter blade, and means to scrape from said cutter blade any of said material which may adhere thereto.

2. A machine for severing sheet material having, in combination, a movable support for sheet material, a cutter blade positioned transversely of said support and coacting therewith to sever said sheet material, mechanism to impart a rotary motion to said cutter blade, means to heat said cutter blade, and a scraper blade slidably mounted on said cutter blade, and means to move the same toward and away from the cutting edge of said cutter blade.

3. A machine for severing sheet material having, in combination, a movable support for sheet material, a cutter blade positioned transversely of said support and coacting therewith to sever said sheet material, mechanism to impart a rotary motion to said cutter blade, means to heat said cutter blade, a scraper blade slidable longitudinally of said cutter blade, and studs fast to said cutter blade and projecting through inclined slots in said scraper blade, whereby the scraper blade may be moved toward and away from the cutting edge of said cutter blade.

4. A machine for severing sheet material having, in combination, a movable support for sheet material, a cutter blade positioned transversely of said support and coacting therewith to sever said sheet material, mechanism to impart a rotary motion to said cutter blade, means to heat said cutter blade, a scraper blade slidable longitudinally of said cutter blade, a stationary cam engaging one end of said scraper blade, studs fast to said cutter blade and projecting through inclined slots in said scraper blade, and a spring adapted to hold one end of said scraper blade against said cam, whereby the scraper blade may be moved toward and away from the cutting edge of said cutter blade.

5. A machine for severing sheet material having, in combination, a belt conveyer for sheet material, a rotatable drum constituting a support for said conveyer, a cutter blade positioned transversely of said conveyer and coacting therewith, mechanism to impart a variable speed rotary motion to said cutter blade, the maximum speed of said rotation occurring when the cutter is severing the material, and means to scrape from said cutter blade any of said material which may adhere thereto.

6. A machine for severing sheet material having, in combination, a belt conveyer for sheet material, a rotatable drum constituting a support for said conveyer, a cutter blade positioned transversely of said conveyer and coacting therewith, mechanism to impart a variable speed rotary motion to said cutter blade, comprising a shaft to which said cutter blade is fastened, a gear eccentrically mounted on said shaft, a driving shaft, a gear splined thereto, a gear shift lever mounted on said driving shaft, and gearing rotatably mounted on said gear shift lever and connecting the gears on said shafts, the eccentric gear being so positioned relatively to the cutter blade that the maximum speed of rotation of said cutter blade occurs when severing the sheet material.

7. A machine for severing sheet material having, in combination, a belt conveyer for sheet material, a rotatable drum constituting a support for said conveyer, a cutter blade positioned transversely of said conveyer and coacting therewith, mechanism to impart a variable speed rotary motion to said cutter blade, comprising a shaft to which said cutter blade is fastened, a plurality of gears of different diameters eccentrically mounted on said shaft, a driving shaft, a gear splined thereto, a gear shift lever mounted on said driving shaft and slidable longitudinally thereof and bifurcated to engage said driving shaft gear on opposite sides thereof, and gearing rotatably mounted on said gear shift lever and connecting the gears on said shafts, whereby a variable speed may be imparted to said cutter blade at each rotation, and also a variable number of rotations per minute.

8. A machine for severing sheet material having, in combination, a movable support for sheet material, a rotary shaft, a cutter blade fast to said shaft, a heating element in said shaft, a collector on said shaft at each end respectively of said cutter blade, said collectors being insulated from said shaft and connected to said heating element, and a brush for each of said collectors connected to an electric circuit.

9. A machine for severing sheet material having, in combination, a belt conveyor for sheet material, a rotary drum constituting a support for said conveyer, a cutter blade coacting with said conveyer and drum to sever said sheet material, and mechanism to impart a rotary motion to said cutter and to said drum, and means to adjust said drum toward and away from said cutter.

10. A machine for severing sheet material having, in combination, a movable support for sheet material, a rotary shaft, a cutter blade fast to said shaft, a heating element in said shaft, a collector on said shaft at each end respectively of said cutter blade, means to insulate said collectors from said shaft, means to connect said heating element to said collectors, a brush for each of said collectors connected to an electric circuit, insulating members upon which said brushes are slidably mounted, and means to hold said brushes against their respective collectors.

11. A machine for severing sheet material, said machine comprising a rotary cutter, means coacting therewith to sever the material, and selective transmission drive means comprising a plurality of means disposed for selectively rotating the cutter at a speed determinately varying within each revolution thereof, but all of said means operating the cutter at substantially the same speed at the severing instant.

12. A machine for severing sheet material, said machine comprising a rotary cutter, means coacting therewith to sever the material, means for imparting rotation to said cutter of a determinate time interval for each revolution and of a speed varying within each revolution thereof, and alternative means for imparting rotation to said cutter of a time interval for each revolution different from that of the rotation imparted by the first said means and of a speed at the time of each severing operation substantially the same as the speed at which the cutter is rotated by the first said means at the time of the severing operation.

13. A machine for severing sheet material, said machine comprising a rotary cutter, means coacting therewith to sever the material, means for imparting rotation to said cutter of a determinate time interval for each revolution and of a speed varying within each revolution thereof, the speed of the cutter being maximum at the time of each severing operation, and alternative means for imparting rotation to the cutter of a time interval for each revolution different from that of the rotation imparted by the first said means and of a speed at the time of each severing operation substantially the same as the maximum speed at which the cutter is rotated by the first said means.

14. A machine for severing sheet material, said machine comprising a rotary cutter, means coacting therewith to sever the material, a driving mechanism, means adapted to be interposed between said driving mechanism and cutter for rotating the latter at a speed varying within each revolution thereof, and alternative means adapted to be interposed between said driving mechanism and cutter for rotating the latter at a speed which at the time of each severing operation is substantially the same as the speed at which the cutter is rotated by the first said means at the time of the severing operation.

In testimony whereof we have hereunto set our hands.

WILLIAM DEXTER EVERETT.
ARCHIBALD WILLIAMS, Jr.